May 4, 1943.        B. BOYSEN        2,318,365
DENTAL AND MOUTH CLEANSING MEANS
Filed March 11, 1940
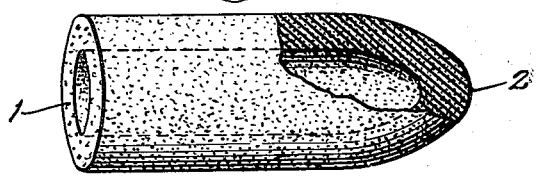
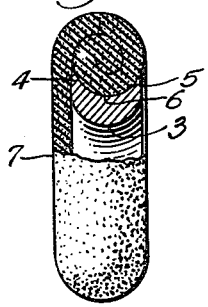 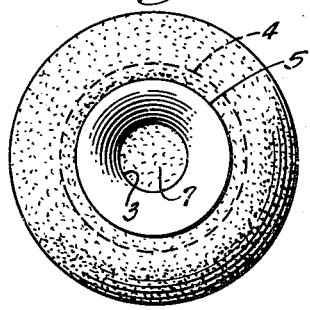 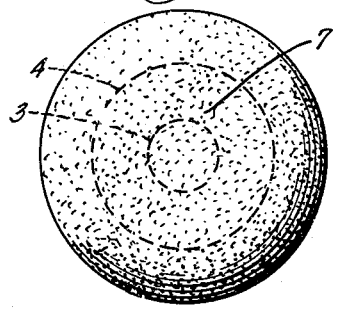
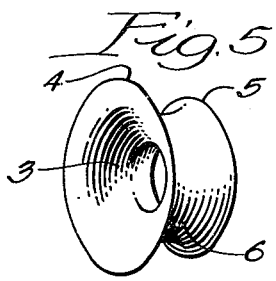 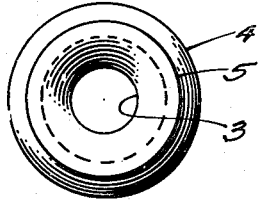
Inventor:
Bigelow Boysen,
By Rummler, Rummler & Davis
Attorneys Patented May 4, 1943

2,318,365

UNITED STATES PATENT OFFICE 2,318,365

DENTAL AND MOUTH CLEANSING MEANS

Bigelow Boysen, Chicago, Ill.

Application March 11, 1940, Serial No. 323,364

5 Claims. (Cl. 15—227)

This invention relates to improvements in dental and mouth cleaning devices.

Among the objects of the invention is that of providing an improved device for cleansing and refreshing the human teeth, gums and oral cavities that can be made to retail at so low a price, that the device may be discarded after a single use. The device will eliminate the old-fashioned handle of the toothbrush in current use and will be small enough to permit quantities of them to be carried on or about the person, thereby making it practical to clean the teeth and gums as often as desired.

A further object of the device is to supply a need that is felt by people who travel, in particular, who often find it necessary to pack the toothbrush generally in current use before the same has had time to dry, with the result that its efficiency is impaired and it becomes unsanitary. These and other deficiencies of the ordinary toothbrush have been overcome by the present invention which will be used but once and then discarded.

Because the device is efficient and pleasant to use, and can be made of suitable materials at low cost, it will be made available to the public either without charge, as by carriers, hotels, clubs, etc. (which will purchase quantities for the convenience of and gratis distribution to their patrons), or at a price sufficiently low (through channels such as drug stores, coin-vending machines, restaurants, etc.) to justify their discard after a single use.

To attain these objects, I have provided a tube of sponge rubber, or other suitable material having a cavitated surface, open at one end and closed at the other, in the shape of a human index finger, which fits over and encases the index finger from its tip to a point between the first and second joints thereof. This tube is, in the process of manufacture, impregnated with a soluble dentifrice. Due to its elasticity and the means by which it is fitted onto the finger, as hereinafter specified, the tubular portion is adapted to human fingers of varying sizes. I have further provided a ring upon which the tubular portion is rolled in the process of manufacture and by means of which the tube can be easily unrolled onto the finger when it is to be used.

The accompanying drawing illustrates a specific embodiment of the invention which contains novel features and combinations by which the foregoing objects may be attained.

Figure 1 is a side view partly in section, of the tubular portion of the device as the same appears when fitted onto the finger.

Fig. 2 is a side or edge view of the device, partly in section, as it appears when rolled onto a carrier or retaining ring which ring also makes it possible to easily apply the device to the finger.

Fig. 3 is a front view of the same.

Fig. 4 is a rear view of the same.

Fig. 5 is a perspective view of the carrier or retaining ring onto which the tubular portion (Fig. 1) is rolled for dispensing and handling purposes, and Fig. 6 is a front view of the same.

In the form shown the invention comprises the combination of a tubular member, of sponge rubber of suitable porosity and elasticity, or some other suitably porous and elastic material, which is open at one end and closed at the other end in substantially the shape of the end of a human finger, a quantity of dentifrice, suitably soluble, impregnating the outerside pores or cavities of said tubular portion and closed end thereof, and a hollow ring or annulus of a material suitably firm and rigid, having an outer circumferential or peripheral surface that is concave in shape and lying between two radial flanges or rims (or the sides or margins of the ring) of unequal diameters, by means of which the tubular portion, when rolled is held in such a position that it may be easily unrolled and properly fitted onto the finger.

The ordinary sequence of certain of the principal steps taken in the manufacturing of the device and, secondly, in its use, will best illustrate the novel features and combinations thereof.

After the tubular portion (Fig. 1) is moulded, or otherwise shaped, the side wall thereof, beginning at the open end 1 is rolled outwardly along the axis of the tube to the closed end 2 thereof which is thereby stretched to form a substantially flat surface as shown in Figs. 2 and 4. The carrier ring or annulus 3 (Figs. 5 and 6) is fitted into the circular roll of the tubular member thereby created, so that the rear flange or rim 4, which is of the greater diameter, becomes adjacent to the inside of the flat stretched surface of the closed end 2 bordered by the circular roll. The diameter of the smaller outer flange or rim 5 of the ring is greater than the smallest inner diameter of the circular roll, but slightly less than the center diameter thereof so as not to obstruct the application of pressure on said circular roll, as hereinafter specified, when the same is to be unrolled onto the finger, the circular roll being outwardly stretched when the ring is fitted into it as aforesaid. The outer periphery 6 of the ring between the sides or rims 4 and 5 thereof is preferably concave in shape and of suitable width to permit the convex inner surface of the circular roll to lie snugly against it at all points by virtue of the elastic contracting of the roll, stretched as aforesaid.

In such form, the device is ready to be fitted onto the finger and used, having been impregnated by dipping, brushing, dusting or otherwise treated, with any suitable soluble dentifrice at some suitable and convenient step in the process of its manufacture or wrapping.

It will be understood that by the rolling down of the side of the tubular portion, as aforesaid, the side thereof disappears temporarily into the circular roll thereby created, the diameter of which roll is increased as the rolling progresses. By virtue of this increase in diameter, each successive layer of the tubular material is increasingly stretched as it becomes part of the roll. It will be seen therefore, that when the roll assumes the position shown in Figs. 2, 3 and 4, considerable contracting force has been created tending to cause the roll to unroll itself back into its original shape.

When the roll is fitted onto the ring 3, however, this tendency is obstructed by the rear rim 4 which preferably has a diameter greater than the center diameter of the circular roll, but less than the outer diameter of said circular roll. When this tendency to unroll is so prevented, a second tendency of the contracting force becomes more active, viz: a tendency of the roll to loosen and untension its several convolutions.

This latter tendency is obstructed by the front rim 5 of the ring 3, which rim has a diameter greater than the inside diameter of the circular roll, but less than the diameter of the annular axis of said roll about which the convolutions are formed. Without such retention, by the rim 5, it would ultimate in the circular roll turning itself inside out and assuming the shape shown in Fig. 1, but in an inverse position. This second tendency is, however, less apparent than the first tendency above noted in view of the fact, among other things, that it is obstructed by the frictional resistance created between the layers or convolutions of the rolled tube due to their being tensioned within the roll.

Although I prefer to have the outer circumference 6 of the ring 3, between the rims 4 and 5, concave in shape to become adjacent at all points to the convex inner surface of the rolled tube and thereby create a further obstacle (by frictional resistance) to the second tendency of the contracting force above noted, such shape is not necessarily essential to the success of the invention, it being understood that the said outer circumference 6 of the ring 3 may be given a number of other shapes that would not militate against the effectiveness of the said rims. Such other shapes may be adopted in the interest of economy of manufacture without seriously impairing the successful achievement of the objects sought to be attained by the ring.

It will be further understood that the tubular portion or member must fit on and encase the finger used, tightly enough to remain in position on the finger during the cleansing operation. In order to accomplish this result, the inner diameter of the tube at or adjacent its opened end, and preferably substantially all portions thereof, must be smaller than the average diameter of the average size adult human finger upon which the same will generally be used. In this respect I prefer to use and adapt the device for use on the index finger, although it can be used or be made to be used on any of the other fingers or thumb.

I have found it most satisfactory to make the inner diameter of the tube approximately ⅓ of an inch and the width of the walls thereof approximately ⅛ of an inch, letting the elasticity of the walls (when the diameter of the tube is stretched as aforesaid) create a contracting pressure that will hold the tubular portion snugly on the finger throughout the cleansing operation when used. The tubular portion may, of course, be made in various lengths, and it will be noted that its length when in position for use on the finger, will vary somewhat depending upon the diameter of that portion of the finger so encased. I prefer to make the tubular portion 1½ inches in length, measuring same from the center of the inside wall of the elliptically rounded end to the open end thereof, while same is in the position shown in Fig. 1.

It will be understood that the dimensions of the ring 3 will be dependent upon the dimensions adopted for the tubular portion, having a due regard for the objects sought to be attained by the ring.

Other novel features and combinations of the invention become apparent in the principal steps taken in the use of the device:

After unwrapping the device, which will then be in the shape shown in Figs. 2, 3 and 4, in which position, it will be understood, the ring 3 is partially concealed in the tube as so rolled, the flat or rear side of the device, indicated at 7 in Figs. 2 and 4, is pressed against the end of that finger of either hand upon which the same is to be used, the flat surface yielding through the opening of the ring, by means of pressure brought to bear by the fingers and thumb of the other hand, placed in positions on the front of the roll just outside of the circumference of the front rim 5 of the ring 3 and roughly equidistant from each other, until, due to the elasticity of the material comprising the tube, said tube is forced back over the rear rim 4 of the ring 3 and off of the same onto the finger upon which it will begin to unroll when continued pressure is so brought to bear. Such continued pressure will cause the roll to completely unroll itself onto the finger causing a portion of the said finger to be completely encased in the tubular portion of the device.

As previously stated, the ring 3 was held in the circular roll of the tubular member by the elastic contraction of said roll, and when that roll is forced back over the rear rim and onto the finger as aforesaid, the ring is released, falls away of its own weight and may be discarded. After the circular roll is completely unrolled onto the finger, the finger so partially enveloped by the tubular portion may be dipped in water whereupon it is ready for use in cleansing and refreshing the teeth, gums and oral cavities, having already been impregnated with a soluble dentifrice as before stated.

The importance of the ring portion 3 of the device becomes apparent when it is remembered that the inside diameter of the tubular portion of the unrolled device is less than the diameter of the portion of the finger that the tube encases. Under such circumstances it would be troublesome to fit the tubular portion onto the finger were it not for the fact that the ring 3, upon which the tubular portion is rolled in the process of manufacture, holds the rolled tube in such a position that its substantially flattened end surface 7 may be pressed against the finger and the tube unrolled onto the finger to encase a portion of it as hereinbefore specified.

I do not mean to limit myself to the shape of either part of the device as illustrated in the drawing. It will be understood that the tubular portion can be made to fit the finger in varying shapes and have various surfaces, i. e., such as corrugations, etc., while yet applying the same principles as disclosed. By such variation the tubular portion could be readily made to have only its tip and under surface, as used on the finger, provided with the cleansing element retaining cavities, while the top portion thereof might be made of a non-porous material, or a less porous material, and have a wall considerably less in thickness. Such a non-porous or less porous material could be made to wholly encase the portion of the finger covered, thereby serving as a base or lining for the porous or cavitated cleansing element which would be permanently attached to the underside and tip of said lining or base, as used on the finger. Such variations in shape can also be accomplished by lessening the thickness of the wall of the top portion only of the tubular portion of the device as used on the finger. Such variations in the tubular portion would, of course, call for corresponding variations in the shape and dimensions of the ring element of the device.

Although but one specific embodiment of this invention is herein shown and described, it will be understood that numerous details of the construction shown may be altered or omitted without departing from the spirit of this invention as defined by the following claims.

I claim:

1. In a device of the class described the combination with a flexible tubular member adapted to encase a human finger and having an outer scrubbing surface, the wall of said tubular member being rolled radially from end to end in an axial direction, of an annular retaining member adapted to receive the rolled tubular member on its outer periphery and having axially spaced radial end flanges of different radial widths.

2. In a device of the class described the combination with a flexible tubular member adapted to encase a human finger and having an outer scrubbing surface, the wall of said tubular member being rolled radially from end to end in an axial direction, of a retaining member comprising an annulus adapted to receive the rolled tubular member on its outer periphery and having axially spaced radial rims of different radial widths between which said rolled member is retained.

3. In a device of the class described the combination with a flexible tubular member adapted to encase a human finger and having one end closed and an outer scrubbing surface, the wall of said tubular member being rolled radially in an axial direction to the closed end, of an annular retaining member adapted to receive the rolled tubular member on its outer periphery, said retaining member having radial end flanges of different radial widths, and the larger of said flanges being disposed inside the rolled tubular member against the closed end portion thereof.

4. The combination with an elastic tubular member adapted to encase a human finger, the wall of said member being rolled radially from end-to-end in an axial direction, of an annular retaining means adapted to receive the rolled tubular member on its outer periphery and having axially spaced radial end flanges of different radial widths.

5. The combination with an elastic tubular member adapted to encase a human finger and having one end closed, the wall of said member being rolled radially in an axial direction to the closed end, of a retaining means comprising an annulus adapted to receive the rolled tubular member on its outer periphery and having radial end flanges to retain the rolled member, one of said flanges being disposed inside the rolled tubular member against the closed end portion thereof.

BIGELOW BOYSEN.